United States Patent
Parsons et al.

(10) Patent No.: US 7,620,633 B1
(45) Date of Patent: Nov. 17, 2009

(54) METHODS AND APPARATUS FOR PRIORITIZING AND SORTING METADATA TO BE DISPLAYED

(75) Inventors: Vincent L. Parsons, San Jose, CA (US); Timothy W. Kukulski, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 184 days.

(21) Appl. No.: 11/273,646

(22) Filed: Nov. 14, 2005

(51) Int. Cl.
*G06F 7/00* (2006.01)
*G06F 17/30* (2006.01)
*G06F 3/048* (2006.01)

(52) U.S. Cl. .......................... 707/7; 715/788; 715/794

(58) Field of Classification Search .................. 707/1, 707/100; 709/203; 715/500, 780
See application file for complete search history.

(56) References Cited

U.S. PATENT DOCUMENTS

| | | | |
|---|---|---|---|
| 6,314,415 B1 * | 11/2001 | Mukherjee | 706/47 |
| 6,609,123 B1 * | 8/2003 | Cazemier et al. | 707/4 |
| 6,611,838 B1 * | 8/2003 | Ignat et al. | 707/101 |
| 6,711,577 B1 * | 3/2004 | Wong et al. | 707/101 |
| 6,754,660 B1 * | 6/2004 | MacPhail | 707/100 |
| 6,924,797 B1 * | 8/2005 | MacPhail | 715/700 |
| 7,185,016 B1 * | 2/2007 | Rasmussen | 707/100 |
| 7,231,612 B1 * | 6/2007 | Mani et al. | 715/841 |
| 2006/0235935 A1 * | 10/2006 | Ng | 709/208 |

* cited by examiner

Primary Examiner—Kuen S Lu
Assistant Examiner—Jason Liao
(74) Attorney, Agent, or Firm—Chapin IP Law, LLC

(57) ABSTRACT

A method and apparatus for computing metadata fields that are valuable or informative based on a particular operation, such as a sort field employed in sorting the content items, dynamically displays the informative metadata fields as a display set with the respective content items in response to the sorting field. A rule set defines a priority of metadata fields for display based on a particular metadata field selected as the sorting field. The rule set is based on a predetermined conclusion about fields deemed to have particular descriptive value to a user when a particular metadata field is employed as the sorting field. The salient metadata fields are selected according to a deterministic rule set indicative of which metadata fields are to be displayed for a particular sort field. The rule set therefore defines a priority of metadata fields to be displayed for each metadata field selected as a sort field.

23 Claims, 9 Drawing Sheets

METHODS AND APPARATUS FOR PRIORITIZING AND SORTING METADATA TO BE DISPLAYED

RELATED APPLICATION

This application is related to co-pending U.S. patent application entitled "METHODS AND APPARATUS TO PREVIEW CONTENT," Ser. No. 11/273,645 filed on an even date herewith, the entire teachings of which are incorporated herein by this reference.

BACKGROUND

Graphical User Interfaces (GUI)s are a common manner of exchanging information between a user and a computer in a modern information processing environment. The graphical user interfaces typically follow a well known window-based structure. The window-based structure allows a screen display to present one or more rectangular windows, each having a particular context. An active window from among the available displayed window corresponds to an application that the user is currently exchanging information with. The windows are navigated via a pointing device, such as a mouse, touchpad or trackball, to select, activate, and provide input to the application corresponding to the window, and the keyboard is often employed for free form textual and/or numeric input.

The windows display and receive control and data information through objects or icons displayed in the window. The underlying application arranges the objects as appropriate for displaying and receiving information. The display objects include control objects, which receive input from the user, and passive objects, that present information but do not expect interactive responses. The typical conventional GUI window presents multiple simultaneous display objects, driven by the underlying application. Often, a user will manipulate the objects with the pointing device or keyboard for selecting and changing the appearance of the windows to facilitate data entry or to more readily obtain or receive information from the application. Often, the GUIs display a set or list of content items, which are objects such as files that contain data, or information. Such content items also have metadata associated with the objects. Metadata is "data about the data," which describes attributes of a content item, such as type, size, format and creation date. Conventional metadata is often stored with, or appurtenant to, the content item to which it pertains. Therefore, metadata is often retrieved by a GUI when accessing the content item for display or invocation by a computer driven application. In this manner, GUIs provide an effective interactive communication medium between a user and the computer driven application.

SUMMARY

In a conventional graphical user interface (GUI), users navigate around a set of windows on a display screen. Often, the windows display a list or set of content items in a computer system, such as files or objects. Typically, the content items are accompanied by the metadata describing the content items. The metadata, in general, is data or information about the type, style, structure, extent or organization of the data in the content item. Specifically, common metadata entities include filename, size, pages, creation date, date last modified, access path and creating application (type), and are usually defined or stored as conventional metadata fields along with or appurtenant to the content item including the data. Users often employ one or more metadata fields for conventional sorting, filtering and otherwise organizing or indexing the data (content items).

Unfortunately, conventional metadata processing suffers from several shortcomings. Typical GUI screens accumulate rows and columns using scroll bars to accommodate areas outside the physical viewing screen. Conventional applications often display metadata in a nonselective, all-inclusive format than users may tend to find excessive or unwieldy, typically via a static default list or all-inclusive selection, resulting in a rather large off-screen scroll region. For example, a conventional email application may list email messages by subject, sender, importance, date created, date sent, date received, and other metadata fields. Conventional applications display the metadata attributes in a horizontally scrolling spreadsheet or chart form, and list individual content items vertically in a row format. Users navigate the metadata fields by scrolling horizontally across the screen to reveal each successive metadata field. Depending on the metadata field size, such horizontal scrolling rapidly becomes tedious and inefficient. Users may have to scroll across a substantial number of columns to find a desired descriptive item, or metadata field.

Exemplary configurations discussed herein are based, in part, on the observation that many times displaying all of the metadata fields is unnecessary or unwanted for users gathering focused information concerning the content items, or assets. Also, space considerations tend to mitigate any advantage to displaying all metadata fields of a content item. Further, in many cases, manually selecting metadata fields that are important for particular operations, such as searches and sorting, is time consuming. Accordingly, taking action based on a metadata field, such as sorting or filtering, requires that the user first scroll to and select the conventional metadata field. This unwieldy approach requires manual selection of the conventional metadata field sought for processing, and does not distinguish or prioritize metadata fields which may be more important, informative or illustrative from the users perspective.

In contrast, configurations of the invention substantially overcome the above described shortcomings by providing a method and apparatus for computing the metadata fields that are valuable or informative based on a particular operation, such as a sort field employed in sorting the content items, and dynamically displaying the metadata fields with the respective content items in response to the sorting field. A rule set defines a priority of metadata fields for display based on a particular metadata field selected as the sorting field. The rule set is based on a predetermined conclusion about fields deemed to have particular descriptive value to a user when a particular metadata field is employed as the sorting field. The salient metadata fields are selected according to a deterministic rule set indicative of which metadata fields are to be displayed for a particular sort field. The rule set therefore defines a priority of metadata fields to be displayed in response to a selection of each particular metadata field selected as a sort field.

A successive alternate selection of a sort field therefore changes the user view of the displayed metadata fields. Sorting on a different metadata field includes the metadata fields deemed by the display rules to be pertinent (i.e. important or informative), to the alternate sort field selection. The included fields are then displayed according to the priority for that selected sort field. Each metadata field, therefore, has a corresponding display set of metadata fields for display when that particular metadata field is selected as the sort field. Metadata fields not in the display set are not shown. The rules also define the priority for display that defines the layout of the fields in the display set, and indicates a physical GUI screen position for the metadata field in relation to the content item to which they apply. In this manner, the user receives a prioritized set of metadata fields based on a sort criteria, rather then consistently being burdened with all metadata fields, or with having to manually select and/or omit metadata fields for display. The display set of metadata fields is responsive to the sort criteria via the display rules, such that a change in the sort criteria dynamically adjusts the displayed metadata according to the new display set and metadata field priority applicable to the new sort criteria (i.e. sort field).

In further detail, configurations discussed herein disclose a method for organizing GUI elements on a display screen by receiving a selection of a metadata field operable for sorting a plurality of content items, such that each of the content items has metadata fields populated depending on the respective content item. A visual display processor has display rules for computing, based on the selected metadata field, a set of metadata fields for display as a display set corresponding to the respective content item in the GUI screen. The display rules indicate or group metadata fields to include in the display set for display responsively to the particular selected metadata field employed for sorting. The visual display processor then sorts the content item set according to the selected metadata field, and displays, for each of the sorted content items, the computed display set of metadata fields for the respective content item. Accordingly, the display set of metadata fields are deterministic from the display rules based on the selected metadata field employed as a sorting field, in which the display rules are responsive to the selected metadata field employed for sorting.

In the exemplary configuration, the display rules define a display priority of the display set of metadata fields for display. Accordingly, the visual display processor indexes, based on the selected metadata field for sorting, a corresponding rule, and computes, based on the indexed rule, the display priority for each of the metadata fields in the display set of metadata fields, such that the display set includes at least a subset of the full set of metadata fields available for display. The defined priority is indicative of a field layout for the metadata fields for display, such that the field layout defines arrangement of complementary fields together on the GUI screen.

In particular configurations, the defined priority is indicative of metadata fields including persistent fields, or metadata fields that are mandatory for display, metadata fields of a secondary priority including the sorting metadata fields, metadata fields of a tertiary priority including complementary (i.e. related or important to) metadata fields of the sorting metadata field, and omitted metadata fields not included in the field layout.

In particular implementations, the defined priority includes a mapping of each of the metadata fields of the content items, such that the mapping is indicative of, for each metadata field of the content item, other metadata fields to be included in the display set of metadata fields. The mapping is responsive to the particular selected metadata field for computing the display set. Therefore, the defined priority includes a mapping from the selected metadata field employed as a sorting field to the metadata fields employed as the display set.

The visual display processor displays the computed display set of metadata fields according to a predetermined metadata layout determined by the display priority, in which each of the content items and corresponding metadata fields are represented by a GUI element on the display screen. Therefore, the visual display processor displays the metadata fields in a deterministic manner selected based on the selected sorting metadata field, in which the deterministic manner defines the metadata layout for each of the selected sorting metadata fields. The display rules may further employ a priority matrix for mapping metadata fields to the display set and display priority. The display rules map each of the selected sorting metadata fields to descriptive metadata fields, such that the descriptive metadata fields are metadata fields having particular descriptive value when simultaneously displayed in a complementary manner with the selected metadata field employed as a sorting field, i.e. displaying related or complementary fields together, for example.

Alternate configurations of the invention include a multi-programming or multiprocessing computerized device such as a workstation, handheld or laptop computer, cellphone or PDA device, or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 7-9 are exemplary GUI screen displays depicting a display set of metadata field responsive to a selected sorting field.

DETAILED DESCRIPTION

Configurations discussed further below provide a system and method for computing the metadata fields that are valuable or informative based on a particular operation, such as a sort field employed in sorting the content items, and dynamically displaying the metadata fields with the respective content items in response to the sorting field. In conventional graphical user interfaces operable for traversing metadata of content items, many times displaying all of the metadata fields is unnecessary or unwanted for users gathering focused information concerning the content items. Further, space considerations tend to mitigate any advantage to displaying all metadata fields of a content item. In many cases, manually selecting metadata fields that are important for particular operations, such as searches and sorting, is time consuming. Accordingly, taking action based on a metadata field, such as sorting or filtering, requires that the user first scroll to and select the conventional metadata field. This unwieldy approach requires manual selection of the conventional metadata field sought for processing, and does not distinguish or prioritize metadata fields which may be more important, informative or illustrative from the users perspective.

In contrast, configurations of the invention discussed herein provide a method and apparatus for computing the metadata fields that are valuable or informative based on a particular operation, such as a sort field employed in sorting the content items, and dynamically displaying the metadata fields with the respective content items in response to the sorting field. A rule set defines a priority of metadata fields for display based on a particular metadata field selected as the sorting field. The rule set is based on a predetermined conclusion about fields deemed to have particular descriptive value to a user when a particular metadata field is employed as the sorting field. The salient metadata fields are selected according to a deterministic rule set indicative of which metadata fields are to be displayed for a particular sort field. The rule set therefore defines a priority of metadata fields to be displayed in response to a selection of each particular metadata field selected as a sort field.

Figure 1:
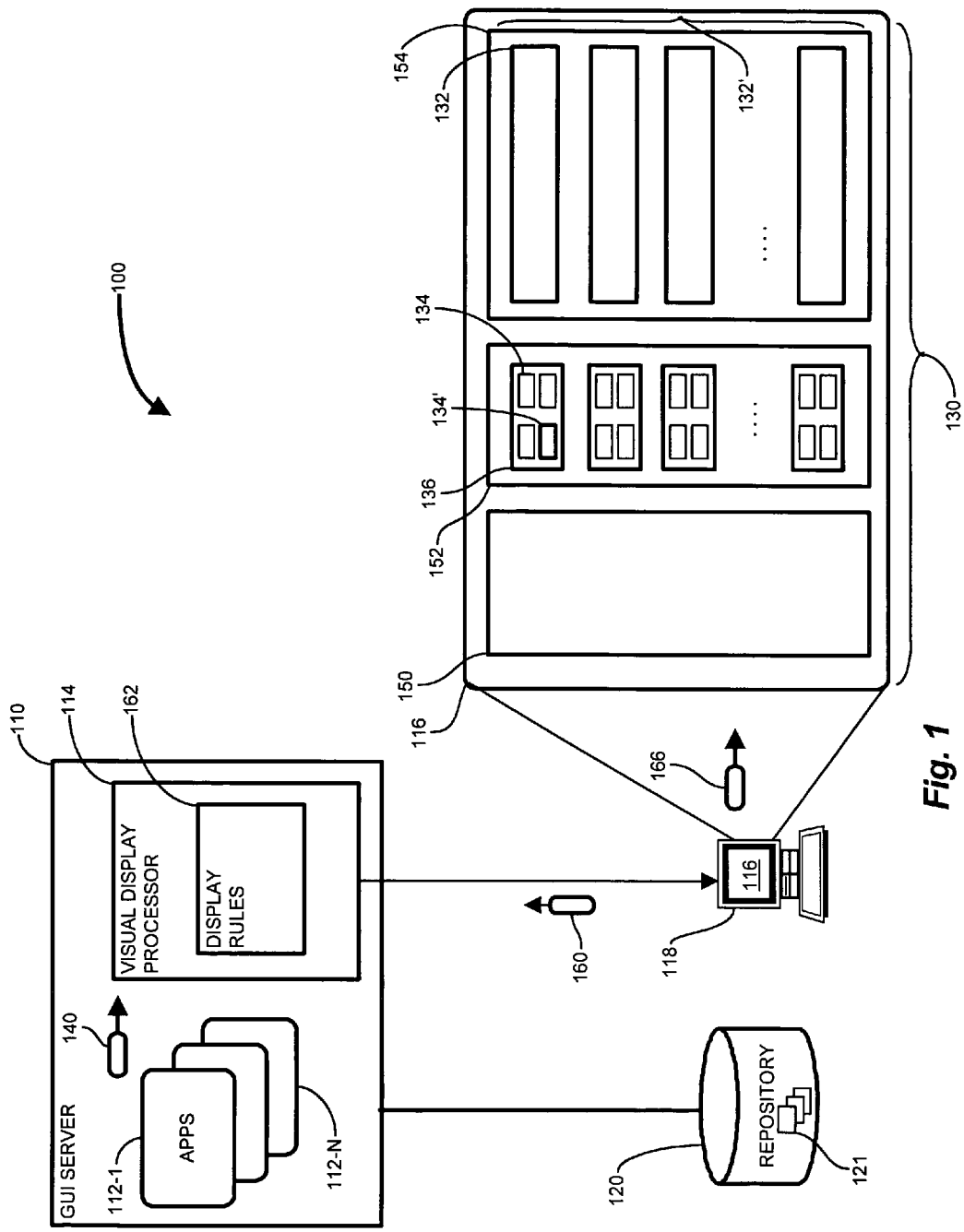
FIG. 1 is a context diagram of an exemplary graphical user interface environment suitable for use with configurations discussed herein.

FIG. 1 is a context diagram of an exemplary embodiment of a graphical user interface (GUI) environment suitable for use with configurations discussed herein. Referring to FIG. 1, the GUI environment 100 includes a GUI server 110 having a plurality of applications 112-1 ... 112-N (112, generally) and a visual display processor 114 operable to provide a visual display 116 via an interactive user device 118, such as a PC, laptop, PDA and the like. The applications 112 perform a variety of operations on behalf of a user, and process and build content items 121 for rendering on the visual display 116. The GUI server 110 connects to a repository 120 for storing programs, data and other information required by the applications for generating and/or retrieving the content objects 121.

The visual display 116 is the prevalent interactive mechanism with a user (not specifically shown), and renders a variety of GUI elements 130 for presenting and retrieving information. Such GUI elements 130 include various graphical entities known in the art, such as windows, icons, menus, pulldowns, buttons, scroll bars. In particular, in conjunction with configurations discussed below, the visual display is operable to display GUI elements 130, including but not limited to content items 132, metadata fields 134, and display sets 136, discussed further below.

In operation, the visual display processor receives a set of content items 140 from an application 112. The content item set 140 may include, for example, a file listing, in which each content item is an individual file. Alternatively, the content items may have more specific content, such as documents, slides, pictures, audio, and/or video, for example. The range of types of content items 132 may vary from application to application. In an exemplary configuration, the content items 132 may be Portable Document Format (PDF) files, and the visual display processor may be the Adobe Acrobat application, marketed commercially by Adobe Systems, Inc., of San Jose Calif.

Regardless of the scope and content of the content item set 140, each of the content items 132 has metadata fields 134 associated with it. The metadata fields 134 are attributes concerning the form, organization, structure or logistics of the content item, and include, for example, file name, type, size, page count, access path, creation date, modification/edit date, author and subject, to name several. Configurations herein provide a selective display of related or important metadata fields 134 in response to a particular metadata field 134' selected as a field of interest, such as a sorting field. Accordingly, when a metadata field 134 is selected as a sorting field 134', the visual display processor 114 computes a corresponding display set 136 of metadata fields 134 to display concurrently with the metadata field of interest 134'. The display set 136 includes metadata fields 134 which the typical user considers important or complementary to the field of interest 134'. For example, a user sorting on subject often is interested in the author of the same file or document. Accordingly, when subject is selected as a sort field, the author is included in the display set 136 of metadata fields 134 displayed, for example. Similarly, when file size is selected as the sort criteria, the page count of printed pages is included in the display set 136.

Figure 2:
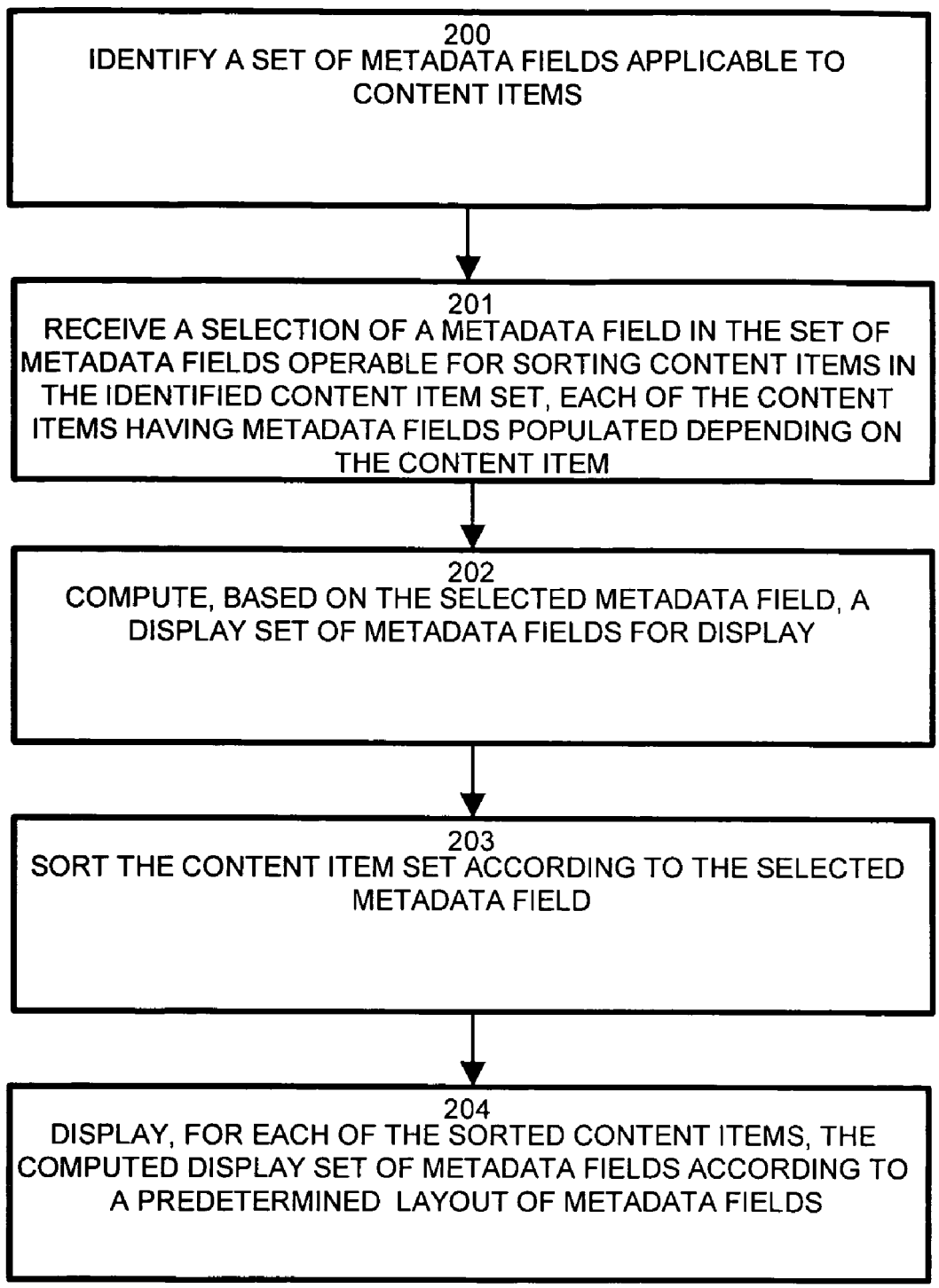
FIG. 2 is a flowchart of metadata field selection in the environment of FIG. 1.

FIG. 2 is an embodiment of a flowchart depicting metadata field selection in the environment of FIG. 1. In one embodiment, referring to FIGS. 1 and 2, the method for dynamically arranging metadata based on selected sort criteria as disclosed herein includes identifying a set of metadata fields 134 applicable to the content items 132. The metadata fields 134 each correspond to a particular content item 132. Accordingly, the type of the content item or items 132 is indicative of the metadata fields 134 applicable. When each of the selected content items 132 in the content item set 140 are similar, the available metadata fields are similar. The metadata fields 134 store the metadata for the content item 132 to which they correspond. In the exemplary configuration, wherein the content items are .PDF files, such metadata may include filename, modified date, file size, number of pages, title, subject, author, keywords, creator, producer and path. Other metadata fields may be applicable to other content item 132 types.

At step 201, the server 110 receives a selection 160 of a metadata field 134 operable for sorting a plurality of content items 132, in which each of the content items 132 has the corresponding metadata fields 134 populated depending on (i.e. specific to) the respective content item 132. In the exemplary configuration shown, the received selection 160 of the metadata field 134 in the set of applicable metadata fields, identified in step 200 is operable for sorting content items in a content item set 132'. The visual display processor 114 computes, based on the selected metadata field 134', a display set 136 of metadata fields 134 for display, as depicted at step 202. The display set 136 is a subset of the available metadata fields for the content item type, and includes metadata fields 134 determined to be most pertinent or useful based on the selected metadata field 134' employed for sorting.

The visual display processor 114 sorts the content item set 132' according to the selected metadata field 134', as depicted at step 203. The visual display processor 114 then displays, for each of the sorted content items 132, the computed display set 136 of metadata fields 134 according to a predetermined layout of metadata fields indicative of the positioning of the metadata fields 134 in the display set 136, as shown at step 204. Thus, the display set 136 is the set of metadata fields 134 that, based on the sorting criteria (metadata field 134'), are the most useful, valuable, or informative for the user to view. Such a predetermined layout indicates the positioning of the display set 136 of fields, according to a display priority, discussed further below. For example, in the exemplary configuration shown, the filename may be deemed the most important, and therefore listed as the first line of the metadata display set 136. The selected metadata field 134' for sorting is likewise positioned prominently, being deemed significant because it is the metadata field 134 upon which the content items 132 were selected for sorting.

Figure 3:
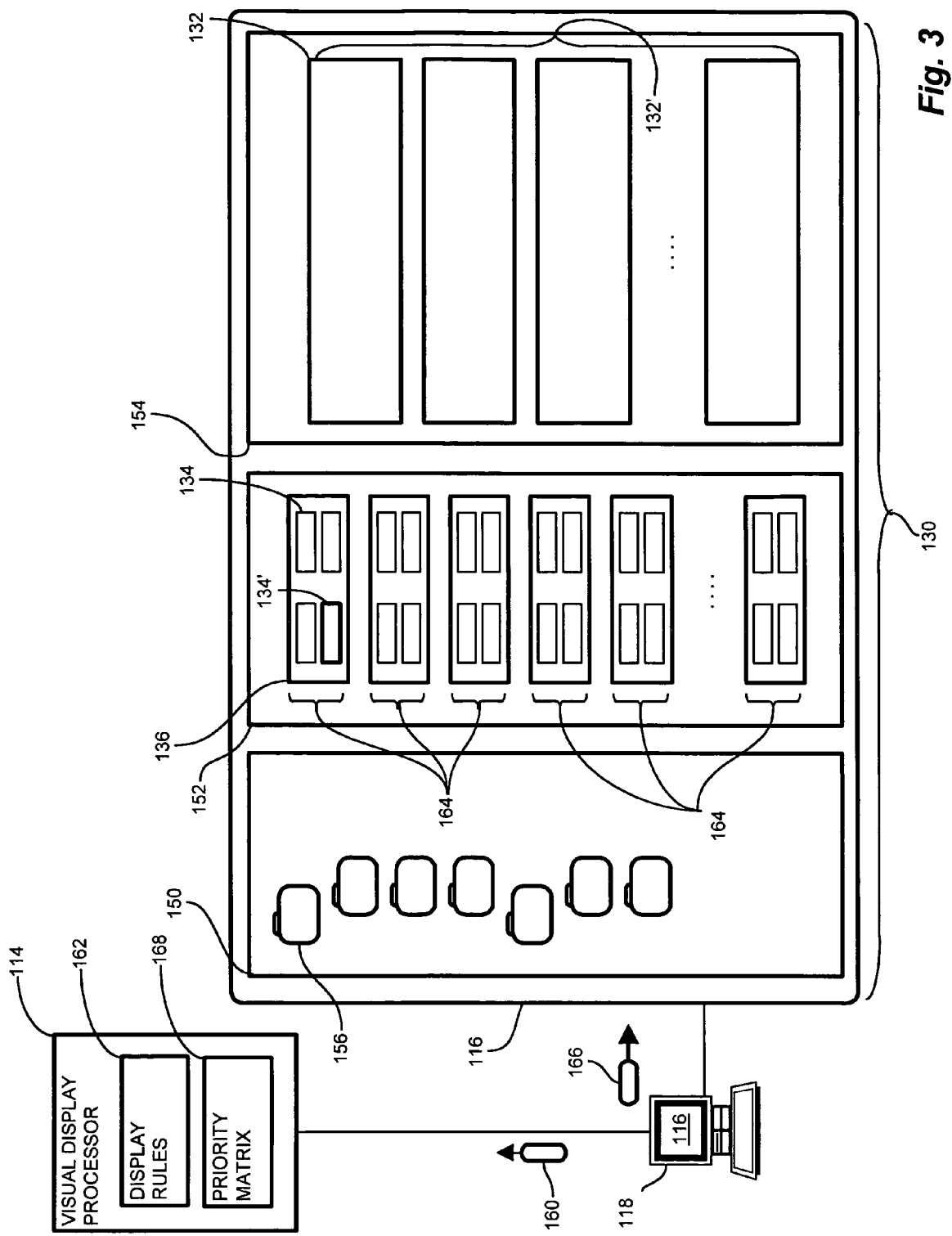
FIG. 3 is a block diagram of a display server in the environment of FIG. 1 operable according to principles of the invention as defined herein.

FIG. 3 is a block diagram of an embodiment of a display server in the environment of FIG. 1 operable according to principles of the invention as defined herein. Referring to FIGS. 1 and 3, the visual display processor 114 renders the user display 116 on an interactive user device (i.e. personal computer, laptop computer, personal digital assistant (PDA) etc) 118. The display 116 includes a content item list window 150, a metadata field window 152, and a content item preview window 154. In the exemplary configuration, the display 116 includes features such as those discussed in copending U.S. patent application Ser. No. 11/273,645, filed Nov. 14, 2005, entitled "METHOD AND APPARATUS TO PREVIEW CONTENT", which is incorporated herein by reference. The content item list window 150 displays a hierarchical selection of available content entities 132, typically arranged in a hierarchical directory structure. The metadata window 152 displays, for a selected content item directory 156, the display set 136 of metadata fields 134 for each content item 132. The preview window 154 displays, for selected content items 132 from the metadata field window 152, a preview 158 of the data in the content item 132. Further details on the preview content are available in the copending patent application cited above.

In operation, the user device 118 receives a selection 160 of a metadata field 134' for sorting, typically via a pointing device (e.g. mouse, touchpad), keyboard, or other I/O device, as is known in the art. The metadata field 134' indicated by the selection 160 appears bolded in the metadata field window 152, and the visual display processor 114 employs a set of display rules 162 to compute the appropriate display set 136 of metadata fields 134. The display rules 162 indicate, for the particular metadata field 134' selected, the metadata fields 134 included in the display set 136. The display rules 162 also indicate a priority of the metadata fields 134 for specifying the layout of the display set 136. For example, in a 4-line metadata field window 164, the most important field is listed first (i.e. highest priority). Further details on the display set, priority and layout are discussed further below. The visual display processor 114 generates a display set message 166 including the display set 136 of metadata fields 134 for the selected content items 156

Figure 4:
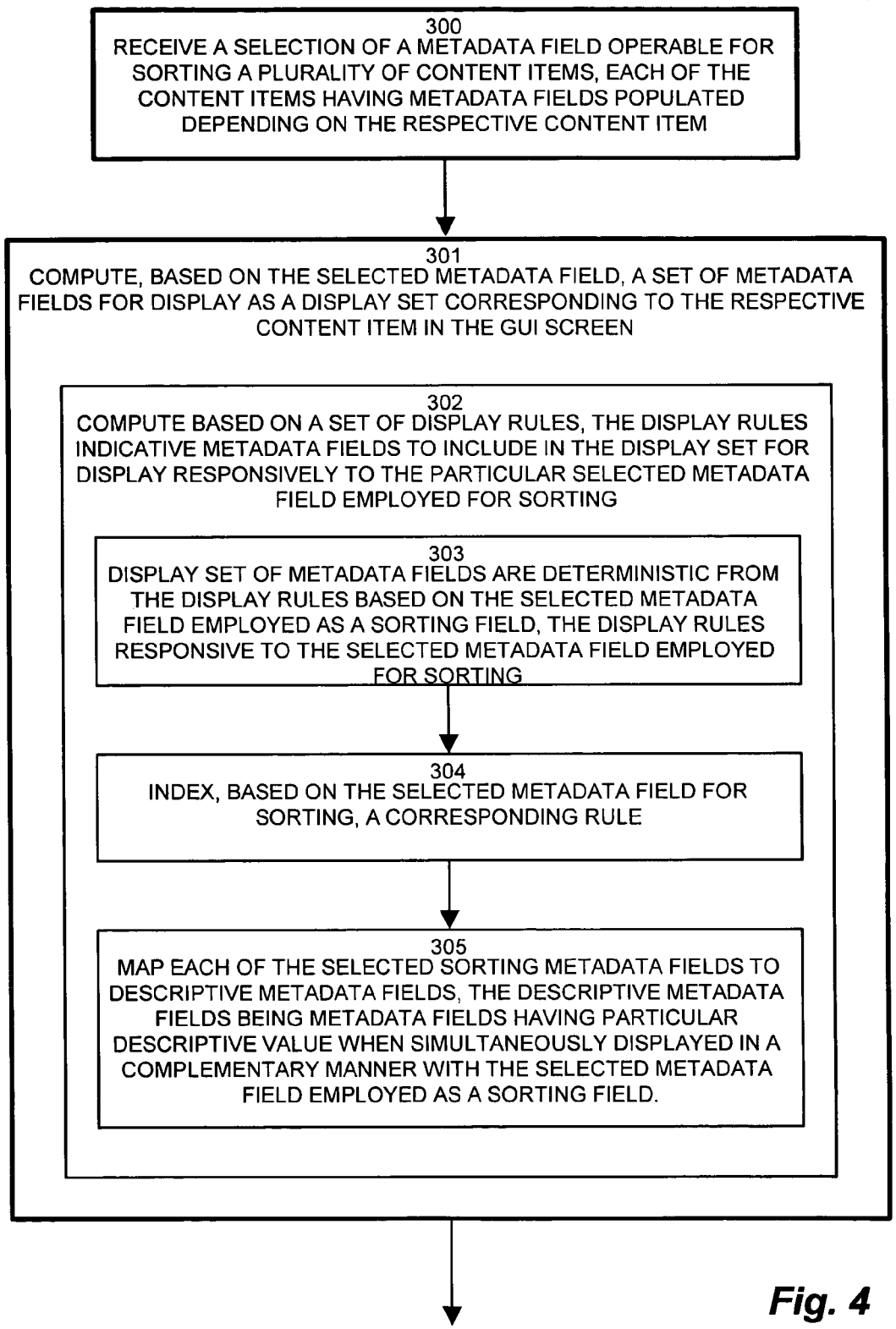
FIGS. 4-6 are a flowchart of metadata display responsive to the display rules in FIG. 3.
Figure 5:
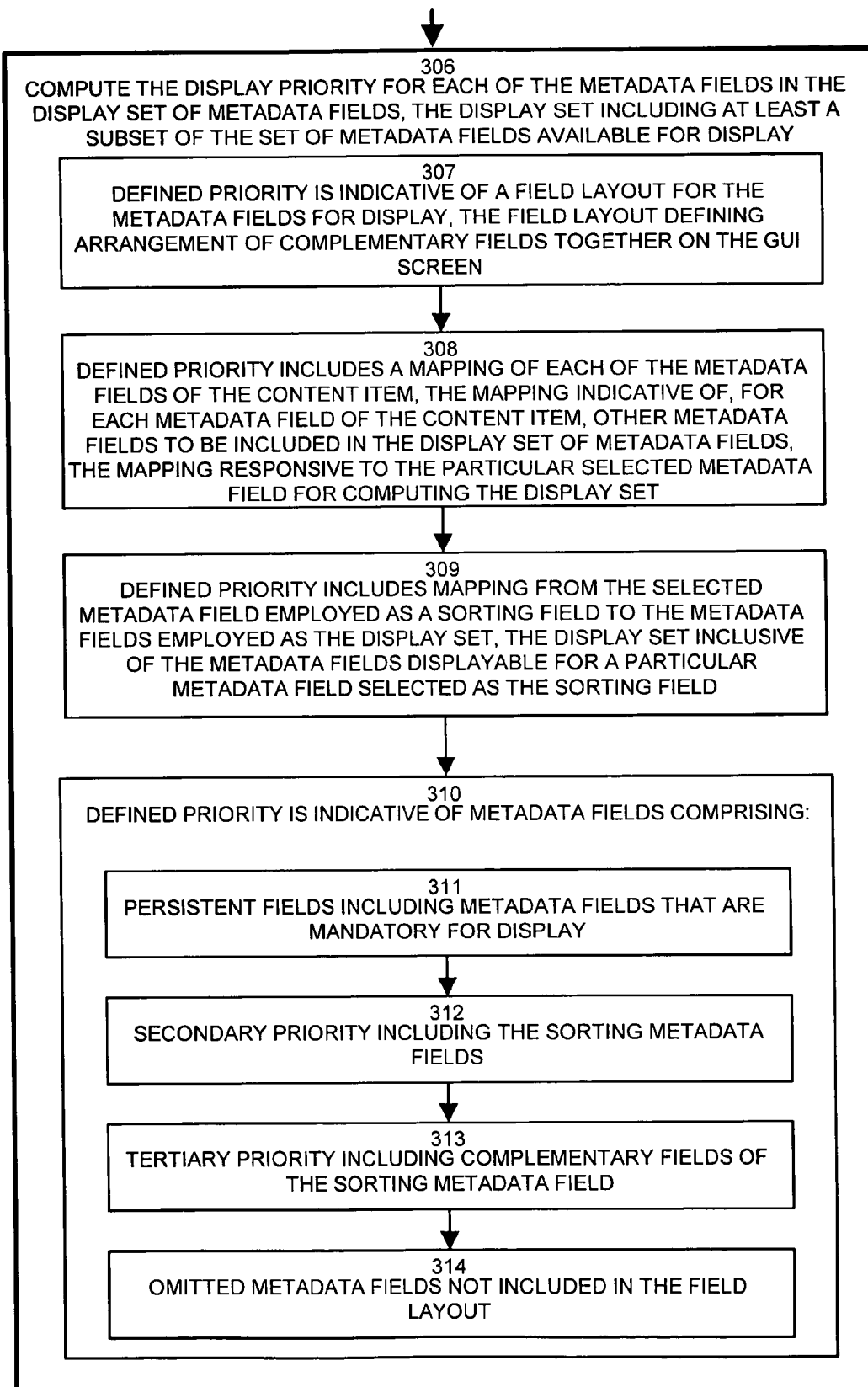
Figure 6:
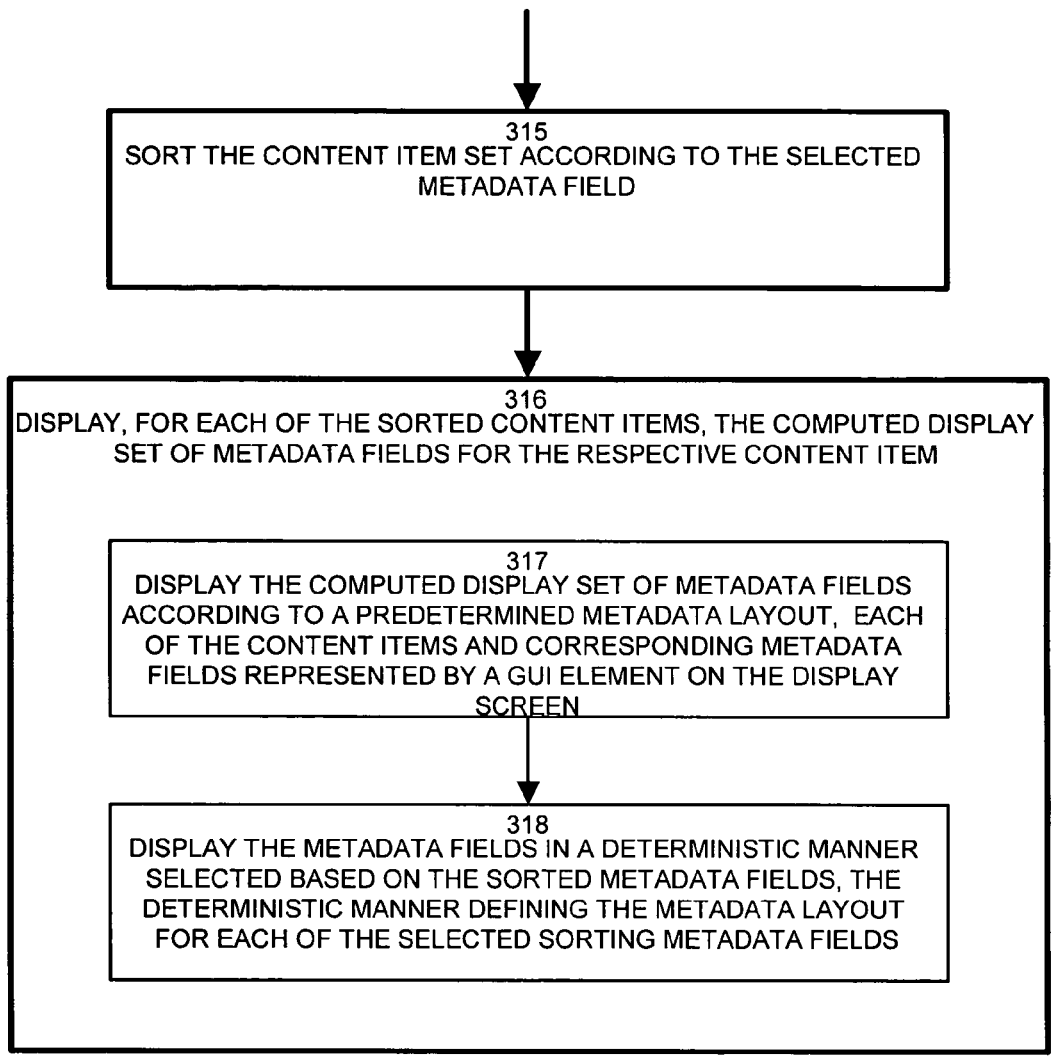

FIGS. 4-6 are a flowchart of an embodiment of metadata display responsive to the display rules in FIG. 3. Referring to FIGS. 3-6, at step 300, the method for organizing GUI elements 130 on a display screen 116 as disclosed herein further includes receiving the user selection 160 of the metadata field 134' operable for sorting the plurality of content items 132 in the content item set 132'. Upon receiving the user selection 160 indicative of the metadata field 134' to employ for sorting, the visual display processor 114 computes, based on the selected metadata field 134', a set of metadata fields 134 for display as a display set 136 corresponding to the respective content item set 132' on the GUI screen 116, as depicted at step 301.

As indicated above, the visual display processor 114 is responsible for computing the display set 136 of metadata fields 134. In further detail, the visual display processor 114 computes the display set 136 based on a set of display rules 162, in which the display rules are indicative of the metadata fields 134 to include in the display set 136 for display responsively to the particular selected metadata field 134' employed for sorting, as shown at step 302. In the exemplary arrangement, therefore, the display set 136 of metadata fields 134 are deterministic from the display rules 162 based on the selected metadata field 134' employed as a sorting field, such that the display rules 162 are responsive to the selected metadata field 134' employed for sorting, as depicted at step 303. In other words, in one embodiment, the display rules 162 specify, for each of the metadata fields 134, the set of other metadata fields 134 to employ as the display set 136 when that metadata field 134 is selected as the sorting metadata field. It should be noted that, in one embodiment, the selected metadata field 134' is included in the display set 136, although alternate configurations may differ.

When computing the display set 136, the display rules 162 also define a display priority of the display set 136 of metadata fields 134 for display. The visual display processor 114 indexes, based on the selected metadata field 134' for sorting, a corresponding rule indicative of a prioritized list (or other prioritized arrangement) of metadata fields 134, as depicted at step 304. In other words, the display set 136 may indicate an ordered list of metadata fields 134, such that the display set 136 is derived from the higher priority fields based on the list. Therefore, the display rules 162 map each of the selected sorting metadata fields 134' to descriptive metadata fields 134, in which the descriptive metadata fields are metadata fields 134 having a particular descriptive value when simultaneously displayed in a complementary manner with the selected metadata field 134' employed as a sorting field 134', as disclosed at step 305. Each of the metadata fields 134 may potentially be employed as a sorting metadata field 134'. The descriptive value is a relative estimation of the informative value of a metadata field 134 when sorted on a particular sorting metadata field 134'. The relative value is therefore an estimation of the user perceived value of the displayed metadata field 134 relative to the sorting metadata field 134'.

The visual display processor 114 computes the display priority for each of the metadata fields in the display set of metadata fields, such that the display set 136 includes at least a subset of the set of metadata fields 134 available for display, as depicted at step 306. As shown at step 307, the defined priority is indicative of a field layout for the metadata fields 134 for display, such that the field layout defines the arrangement of complementary metadata fields 134 together on the GUI screen 116. Therefore, while the display set 136 represents an unordered set of metadata fields 134 for display, the priority defines an ordering used for placement of the metadata fields in the display set 136, as will be discussed further below with respect to the exemplary display screens in FIGS. 7-9. It should be apparent that for metadata fields 134 not in a particular display set 136, the priority may be considered moot.

In one embodiment, the defined priority, therefore, includes a mapping of each of the metadata fields 124 of a particular content item 132, such that the mapping is indicative of, for each metadata field of the content item, other metadata fields to be included in the display set of metadata fields, in which the mapping is responsive to the particular selected metadata field for computing the display set, as depicted at step 308. In a particular configuration, such a mapping may be embodied as a priority matrix 168 invokable by the display rules 162. In such a matrix arrangement, the defined priority includes mapping from the selected metadata field 134' employed as a sorting field to the metadata fields 134 employed as the display set 136, as depicted at step 309. Such a mapping configuration employing a priority matrix 168 affords each metadata field 124 its own priority, allowing additional granularity in the display rules 162 for computing the display set 136 and the priority of the display set metadata fields 134 in response to a particular sorting metadata field 132'.

The priority further defines, in addition to the per-field granularity of the matrix approach described above, a multi-tier priority encompassing groupings of metadata fields. The groupings also define the layout, or placement, of the metadata fields in the metadata window 152. Therefore, the defined priority is indicative of metadata fields 134 and placement thereof, as depicted at step 310. In the exemplary arrangement, four priority tiers are employed, and correspond to four lines employed for metadata fields 136 for each content item 132. Accordingly, the priority indicates persistent fields including metadata fields 134 that are mandatory for display, as shown at step 311. In the exemplary configuration, filename and file path are metadata attributes 134 that are persistent, and are always shown irrespective of the selected sort field 134'. Further, the layout of these metadata fields places these fields at the first and last lines of the four line window 164 for the display set 136.

At step 312, a secondary priority includes the selected sorting metadata field 134', as shown at step 312. The sorting metadata field 134' attains the second priority because it is inferred to have a value to the user by virtue of being selected as the sorting field 134'. The sorting field 134' is shown in the window 164 as the third line in the layout, unless, of course, a persistent field is from step 311 is employed as the sorting field 134'. A tertiary priority includes complementary fields of the sorting metadata field 132' and occupies the second line of the layout window 164, as depicted at step 313. The complementary or associated metadata field 132 is a field deemed by the matrix 166 to have informative value relative to the sorting field 134'. A fourth priority denotes omitted metadata fields 134 not included in the field layout, as depicted at step 314. Such metadata fields 132 are those not in the display set 136 as indicated by the display rules 162. Note that such fields are nonetheless displayable if selected as the sorting field 134' or are complementary to the sorting field 134', as will be discussed further in the screen examples below in FIGS. 7-9. Therefore, the display window 164 presents a dynamic arrangement of metadata fields 134 based on the selected sorting field 134' that computes the metadata fields 134 having the optimal informative value to the user as a complementary field 132 to the sorting metadata field 132'. Further, in alternate configurations, the sorting field 132' may simply be denoted as an action field upon which some processing action is performed (e.g. filtering, transformation, extraction) and the display rules focused on such an action field.

Following computation of the display set 136, the priority of the metadata fields 134 in the display set 136, and the layout for the display window 164, the visual display processor 114 sorts the content item set 136 according to the selected metadata field 134', as depicted at step 315. The display set 136 and the corresponding content item 132 are, of course, sorted together since the metadata 134 is appurtenant to the content item 132 to which it pertains.

At step 316, the visual display processor 114 displays, for each of the sorted content items 132, the computed display set 136 of metadata fields for the respective content item 132. The display window 164 displays the computed display set 136 of metadata fields according to the predetermined metadata layout computed in step 310, such that, each of the content items 132 and corresponding metadata fields 134 are represented by a GUI element 130 on the display screen 116, depicted at step 317. As will be discussed further below, a subset of content items 132 is displayed in a preview form, and may be refined by scroll bars and display window 154 selection, as discussed in further detail in the copending application cited above. Therefore, displaying the metadata fields 134 in a deterministic manner selected based on the sorted metadata fields 134 includes defining the metadata layout for each of the selected sorting metadata fields based on the computed priority according to the matrix 168, as depicted at step 318.

Figure 7:
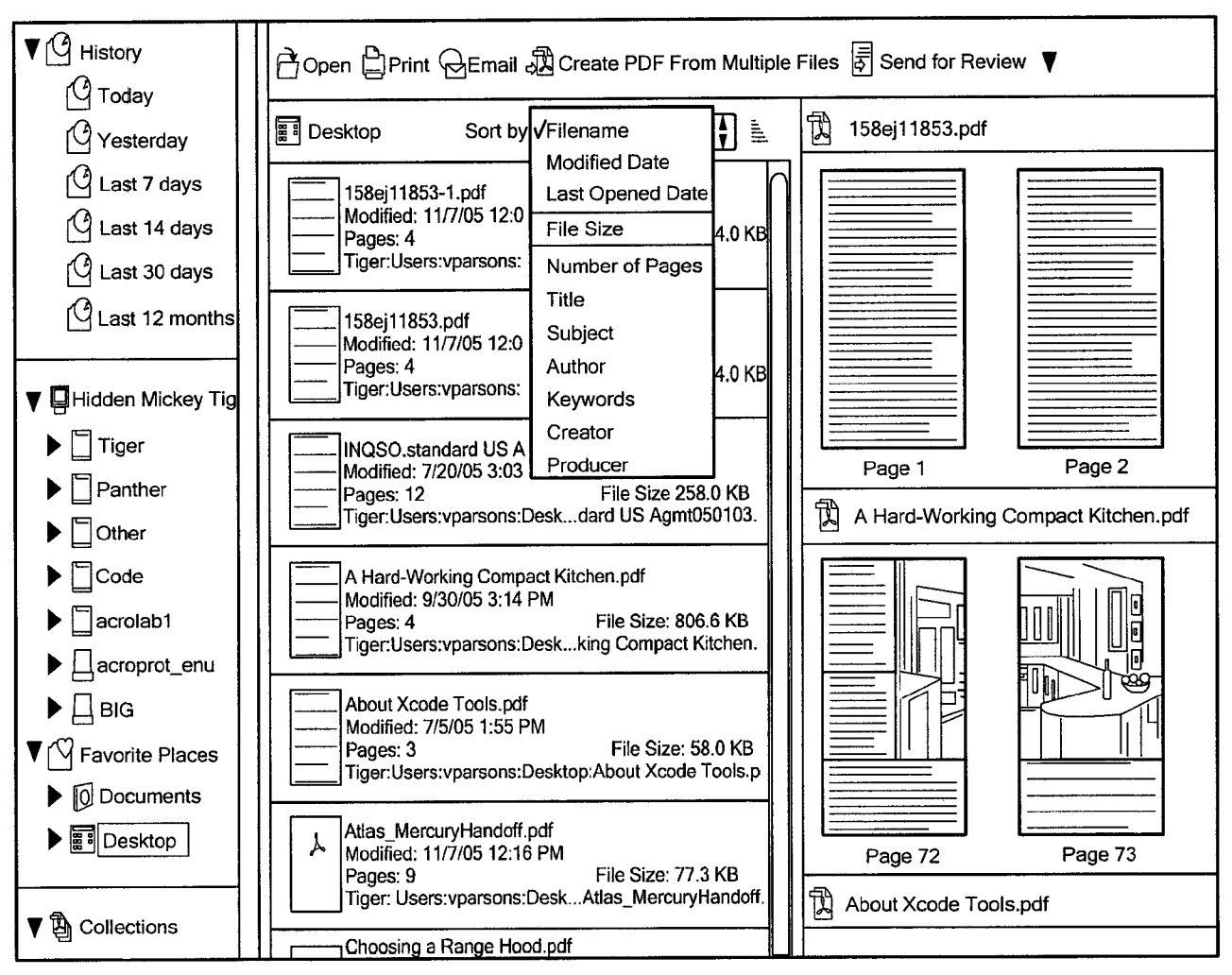
Figure 8:
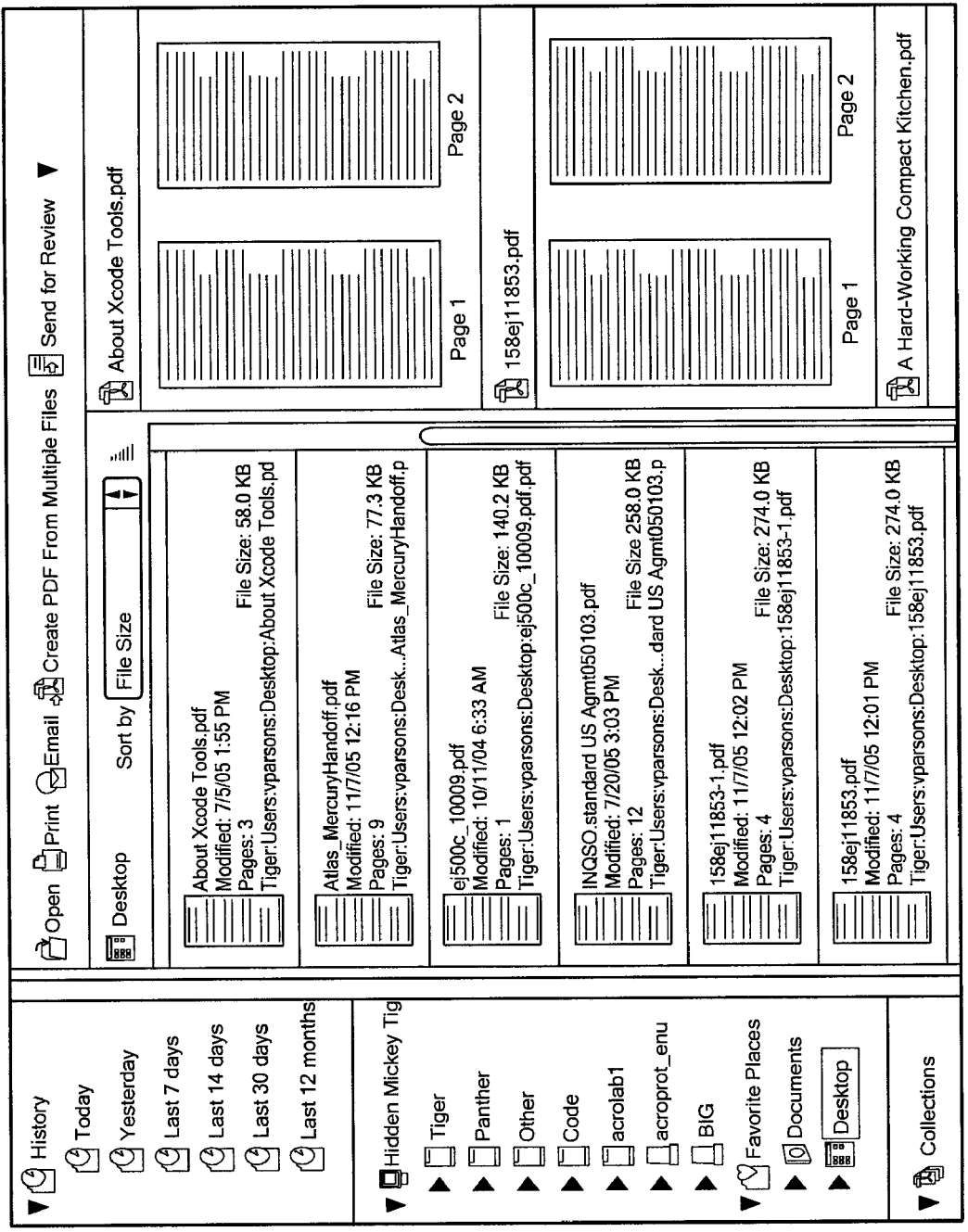
Figure 9:
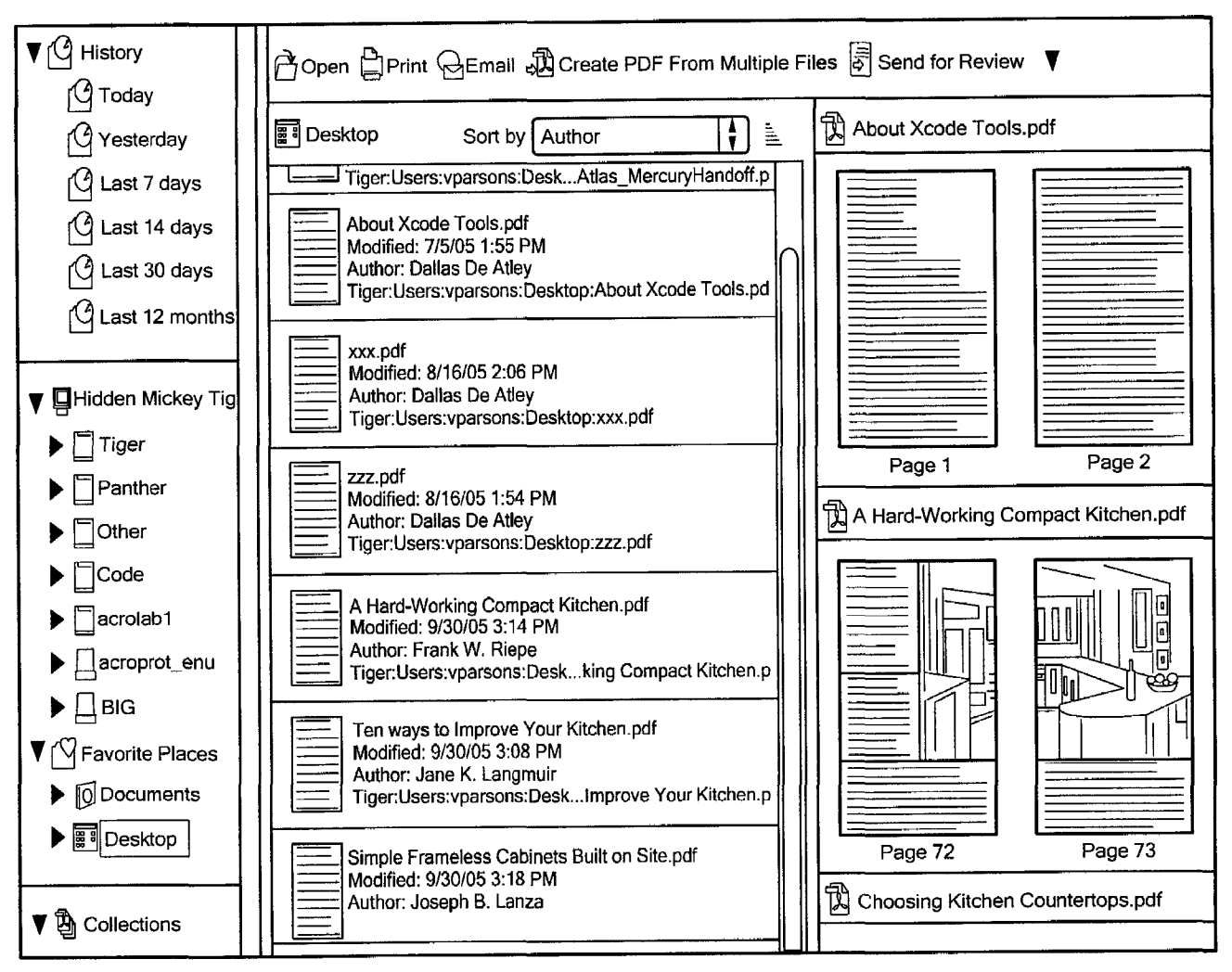

FIGS. 7-9 illustrate embodiments of GUI screen displays depicting a display set of metadata field responsive to a selected sorting field 134'. Each of the GUI screens in FIGS. 7-9 depicts an exemplary display 116 during operation of metadata selection and sorting operations by the visual display processor 114. Referring to FIGS. 3 and 7, the display 116 shows a filename selection 500 for the selected metadata field 134' for sorting. The content items list 150 has the desktop 530 highlighted. Accordingly, the metadata window 152 lists display sets 136 for content items 132 from the desktop 530 in each display window 164. As is apparent in the display 116, the content item list 150 has organization features typical in file and object organizational mechanisms. For example, the desktop 530 is shown in a portion 532-1 with file entities, allowing access to current files or objects 156. A history portion 532-2 allows access to previously requested content items, such as web pages. Therefore, the history portion 532-2 displays a time based continuum, while the file portion 532-1 displays a continuum ranging the local storage. Other portions 532-N are provided, such as a collections portion 532-3, for alternate organizational schemes.

The metadata display window 152 lists the metadata fields 134 of the desktop 530 content items 132 in a series of metadata windows 164-1 . . . 164-N (164 generally). Each of the metadata windows 164 displays the metadata attributes 134 of the display set 136 as discussed above. A set of layout cells 520-1 . . . 520-5 defines the layout, and are each assigned to a particular line 510-1 . . . 510-4 (510 generally) of each display window 164. The content item preview window 154 shows preview elements, or pages 540 for the content items 132 to which the metadata 134 corresponds. Due to space and formatting constraints, the preview window 154 generally shows a subset of the content items 132 referred to by the metadata window 152, shown as highlighted display windows 164-2, 164-4 and 164-5. Screen navigation sliders (not specifically shown) allow manipulation along each of the windows 150, 152 and 153.

As shown in the filename sort view 500, a pulldown 550 allows selection of the selected metadata field 134' for sorting. Each of the available attributes 134-1 . . . 134-11 (134 generally, as above) for sorting is selectable via a checkoff button 552, and a highlighted bar 554 indicates traversal among the metadata fields 134-N. Referring to display window 164-5 as an exemplary window 164, the filename cell 520-1 is bolded to indicated it is the selected metadata field 134' for sorting. As discussed above, in the exemplary configuration, the filename and path in cells 520-1 and 520-5, respectively, retain persistent field status and are afforded layout lines 510-1 and 510-4. Related metadata fields modified date 134-2, pages 134-5 and file size 134-4 occupy cells 520-2, 520-3 and 520-4 respectively, being tertiary fields according the priority, and shown on lines 510-2 and 520-3 based on the predetermined layout. It should be noted that the sort metadata field filename 134', being a persistently displayed field, overrides the secondary priority of the sort field display cell 520-3. Accordingly, the display set 136 specified by the display rules 162 include the fields modified date 134-2, pages 134-5 and file size 134-4.

Further, being a highlighted display set 136, the content item 132-2 referred to in the metadata window 164-4, is shown in the preview window 154 as preview items 540, along with content item 132-1 corresponding to window 164-2 and content item 132-2 corresponding to window 164-5.

Referring to FIG. 8, and continuing to refer to FIGS. 3 and 7, a view 510 depicting the metadata field filesize 134-4 as the selected sorting field 134' is shown in the display 116. In this example, using exemplary display window 164-6, the file size metadata field 134-4 is bolded in display cell 520-4. The display rules 162 specify the sorting metadata field 134', being a secondary priority, be displayed in line 510-3. As above, the persistent metadata fields filename and path are shown in cells 520-1 and 520-5, at the top and bottom lines 510-1, 510-4, respectively. In this case, for the sorting metadata field filesize 134-4, the display rules specify that filesize 134-4 and page count 134-5 be paired together on the same line 510-3. Further, the modified date is a priority 3 field included in the display set 136 for a sorting metadata field 134' of file size 134-4, and therefore occupies cell 520-2.

Referring to FIG. 9, the author 134-8 is chosen as the sorting metadata field 134'. Accordingly, the metadata field author 134-8 occupies the cell 520-3 on line 510-3 as the sorting field 134'. Filenames and path persist as the first 510-1 and last 510-4 lines, and the modified date 134-2 occupies cell 520-2 as included in the display set 136 according to the display rules 162. Therefore, the display rules 162 indicate layout placement in the cells 520-N, as well as grouping of metadata fields 134 in the display set 136. For example, as shown above, file size 134-4 and page count 134-5 are paired together in the display set.

Those skilled in the art should readily appreciate that the programs and methods for metadata processing and display as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for metadata processing and display has been particularly shown and described with references to embodiments thereof, it will be understood by those skilled in the art that various changes in form and details may be made therein without departing from the scope of the invention encompassed by the appended claims.

What is claimed is:

1. A method for organizing graphical user interface (GUI) elements on a display screen responsive to an encoded set of instructions performed by a processor comprising:
   receiving a selection of a metadata field, the selection operable for sorting a plurality of content items, each of the content items having metadata fields populated depending on attributes of the respective content item;
   computing, based on the selected metadata field, a set of metadata fields for display as a display set corresponding to the respective content item in the display screen, computing further comprising:
   identifying priority tiers, the priority tiers predetermined prior to instantiation of the current display screen and indicative of groupings of metadata fields for display;
   defining a priority matrix for mapping, for each metadata field of the content item, one of the priority tiers such that the priority matrix defines predetermined inclusion of a metadata field in a priority tier based on the selected sorting field;
   identifying a set of display rules, the display rules defining a display priority for each of the priority tiers, the identified display priority based on a metadata field selected as a sorting field and on fields deemed to have particular descriptive value to a user when a particular metadata field is employed as the sorting field;
   computing based on the set of display rules, at least one priority tier as the display set of metadata fields defined by the display rules responsive to the selected metadata field employed as a sorting field, the computing display set for display responsively to the particular selected metadata field employed for sorting;
   sorting the plurality of content items according to the selected metadata field; and
   displaying, for each of the sorted content items, the computed display set of metadata fields for the respective content item, displaying further comprising displaying the computed display set of metadata fields according to a predetermined metadata layout, each of the content items and corresponding metadata fields concurrently displayed as a GUI element on the display screen;
   mapping further comprising mapping, for the selected sorting field, a group of metadata fields in each of the priority tiers, the priority tiers being prioritized according to the informative value of a metadata field based on the selected sorting field, the mapping priority tiers including:
   a first priority tier of mandatory fields, the mandatory fields being first selected for display;
   a second priority tier including the selected sorting field, the sorting field being selected second for display;
   a third priority tier including complementary fields, the complementary fields having informational value and being selected third for display; and
   a fourth priority tier, the fourth priority tier not selected for inclusion in the display set, the priority matrix including the metadata fields in each tier for the selected sorting field.

2. The method of claim 1 wherein the display rules define a display priority of the display set of metadata fields for display, further comprising:
   indexing a corresponding rule based on the selected metadata field for sorting; and
   computing, based on the indexed rule, the display priority for each of the metadata fields in the display set of metadata fields, the display set including at least a subset of the set of metadata fields available for display.

3. The method of claim 2 wherein the defined display priority is indicative of a field layout for the metadata fields for display, the field layout defining arrangement of complementary fields together on the display screen.

4. The method of claim 3 wherein the defined priority is indicative of metadata fields comprising:
persistent fields including metadata fields that are mandatory for display;
a secondary priority including the sorting metadata fields;
a tertiary priority including complementary metadata fields of the sorting metadata field; and
omitted metadata fields not included in the field layout.

5. The method of claim 3 wherein the defined priority includes a mapping from the selected metadata field employed as a sorting field to the metadata fields employed as the display set.

6. The method of claim 1 further comprising displaying the metadata fields in a deterministic manner selected based on the sorted metadata fields, the deterministic manner defining a predetermined metadata layout for each of the selected sorting metadata fields indicative of the positioning of the metadata fields in the display set.

7. The method of claim 6 wherein the display rules map each of the selected sorting metadata fields to descriptive metadata fields, the descriptive metadata fields being metadata fields having particular descriptive value when simultaneously displayed in a complementary manner with the selected metadata field employed as a sorting field.

8. A method for dynamically arranging metadata for display on a visual display screen responsive to a graphical user interface application based on selected sort criteria, the method comprising:
identifying a set of metadata fields applicable to a set of content items;
receiving a selection of a metadata field of the set of metadata fields, the selecting operable for sorting the set of content items, each of the content items having corresponding metadata fields populated depending on attributes of the content items;
computing based on the selected metadata field, a display set of metadata fields for display as a display set corresponding to the respective content item in the display screen, computing further comprising:
identifying priority tiers, the priority tiers predetermined prior to instantiation of the current display screen and indicative of groupings of metadata fields for display;
defining a priority matrix for mapping, for each metadata field of the content item, one of the priority tiers such that the priority matrix defines predetermined inclusion of a metadata field in a priority tier based on the selected sorting field;
identifying a set of display rules, the display rules defining a display priority for each of the priority tiers, the identified display priority based on a metadata field selected as a sorting field and on fields deemed to have particular descriptive value to a user when a particular metadata field is employed as the sorting field;
computing based on the set of display rules, at least one priority tier as the display set of metadata fields defined by the display rules responsive to the selected metadata field employed as a sorting field the computed display set for display responsively to the particular selected metadata field employed for sorting;
sorting the set of content items according to the selected metadata field to generate a content set defined by a subset of the content items; and
displaying, for each of the sorted content items included in the set of content items, the content item and the corresponding computing display set of metadata fields according to a predetermined layout of metadata fields, each of the content items and corresponding metadata fields concurrently displayed;
mapping further comprising mapping for the selected sorting field, a group of metadata fields in each of the priority tiers, the priority tiers being prioritized according to the informative value of a metadata field based on the selected sorting field, the mapped priority tiers including:
a first priority tier of the mandatory fields, the mandatory fields being first selected for display;
a second priority tier including the selected sorting field, the sorting field being selected second for display;
a third priority tier including complementary fields, the complementary fields having informational value and being selected third for display; and
a fourth priority tier, the fourth priority tier not selected for inclusion in the display set; the priority matrix including the metadata fields in each tier for the selected sorting field.

9. A visual display processor for organizing graphical user interface (GUI) elements on a display screen comprising:
an interface to a user device adapted to receive a selection of a metadata field operable for sorting a plurality of content items, each of the content items having metadata fields populated depending on attributes of the respective content items;
display rules operable to compute, based on the selected metadata field, a set of metadata fields for display as a display set corresponding to the respective content item in the display screen, computing further comprising:
identifying priority tiers, the priority tiers predetermined prior to instantiation of the current display screen and indicative of groupings of metadata fields for display;
defining a priority matrix for mapping, for each metadata field of the content item, one of the priority items such that the priority matrix defines predetermined inclusion of metadata field in a priority tier based on the selecting sorting field;
identifying a set of display rules, the display rules defining a display priority for each of the priority tiers, the identified display priority based on a metadata field selected as a sorting field and on fields deemed to have particular descriptive value to a user when a particular metadata field is employed as a sorting field, the display rules indicative of the metadata fields to include in the display set, the display set of metadata fields deterministic from the display rules based on the selected metadata field employed as a sorting field, in which the display rules are responsive to the selected metadata field employed for sorting, the display set for responsively to the particular selected metadata field employed for sorting;
the visual display processor for sorting the content item set according to the selected metadata field; and
a display interface operable to display, for each of the sorted content items, the computed display set of metadata fields for the respective content item, the display interface operable to display the computed display set of metadata fields according to a predetermined metadata layout, each of the content items and corresponding metadata fields concurrently displayed as a GUI element on the display screen;

mapping further comprising mapping for the selected sorting field, a group of metadata fields in each of the priority tiers, the priority tiers being prioritized according to the to the informative value of a metadata field based on the selected sorting field, the mapping priority tiers including:

a first priority tier of mandatory fields, the mandatory fields being first selected for display;

a second priority tier including the selected sorting field, the sorting field being selected second for display;

a third priority tier including complementary fields, the complementary fields having informational value and being selected third for display; and a fourth priority tier, the fourth priority tier not selected for inclusion in the display set, the priority matrix including the metadata fields in each tier for the selected sorting field.

10. The display processor of claim 9 wherein the display rules define a display priority of the display set of metadata fields for display, the display rules further operable to:

index, based on the selected metadata field for sorting, a corresponding rule; and compute the display priority for each of the metadata fields in the display set of metadata fields, the display set including at least a subset of the set of metadata fields available for display.

11. The display processor of claim 10 wherein display rules are further operable to define a priority indicative of a field layout for the metadata fields for display, the field layout defining arrangement of complementary fields together on the display screen.

12. The display processor of claim 11 wherein the display rules are operable to define:

persistent fields including metadata fields that are mandatory for display;

a secondary priority including the sorting metadata fields;

a tertiary priority including complementary metadata fields of the sorting metadata field; and omitted metadata fields not included in the field layout.

13. The display processor of claim 11 wherein the display rules are operable to invoke a priority matrix adapted to map of each of the metadata fields of the content item, the mapping indicative of, for each metadata field of the content item, other metadata fields to be included in the display set of metadata fields, the mapping responsive to the particular selected metadata field for computing the display set.

14. The display processor of claim 13 wherein the defined priority includes a mapping from the selected metadata field employed as a sorting field to the metadata fields employed as the display set.

15. The display processor of claim 9 wherein the display screen is responsive to the display interface and further operable to display the computed display set of metadata fields according to a predetermined metadata layout, each of the content items and corresponding metadata fields represented by a GUI element on the display screen.

16. The display processor of claim 15 wherein the predetermined metadata layout further comprises displaying the metadata fields in a deterministic manner selected based on the sorted metadata fields, the deterministic manner defining the metadata layout for each of the selected sorting metadata fields.

17. The display processor of claim 16 further comprising a priority matrix responsive to the display rules, wherein the display rules employ the priority matrix operable to map each of the selected sorting metadata fields to descriptive metadata fields, the descriptive metadata fields being metadata fields having particular descriptive value when simultaneously displayed in a complementary manner with the selected metadata field employed as a sorting field.

18. A computer program product having a computer readable storage medium operable to store computer program logic embodied in computer program code encoded thereon that, when executed by a processor, perform a method of organizing graphical user interface (GUI) elements on a display screen, the method comprising:

receiving a selection of a metadata field operable for sorting content items in a content item set, each of the content items having metadata fields indicative of attributes of the content item;

computing, based on the selected metadata field, a set of metadata fields to be displayed for each content item, computing further comprising:

identifying priority tiers, the priority tiers indicative of predetermined groupings of metadata fields for display; identifying the priority tiers further comprising:

identifying a first priority tier of mandatory fields, the mandatory fields being first selected for display;

identifying a second priority tier including the selected sorting field, the sorting filed being selected second for display;

identifying a third priority tier including complementary fields, the complementary fields having informational value and being selected third for display; and identifying a fourth priority tier, the fourth priority tier not selected for inclusion in the display set;

defining a priority matrix for mapping, for each metadata field of the content item, one of the priority tiers;

identifying a set of display rules, the display rules defining a display priority for each of the priority tiers, the identified display priority based on a metadata field selected as a sorting field; and computing based on the set of display rules, at least one priority tier as the display set of metadata fields defined by the display rules responsive to the selected metadata field employed as a sorting field, the computed display set for display responsively to the particular selected metadata field employed for sorting;

sorting the content item set according to the selected metadata field;

indexing a corresponding rule based on the selected metadata field for sorting;

computing, based on the indexed rule, the display priority for each of the metadata fields in the display set of metadata fields, the display set including at least a subset of the set of metadata fields available for display; and displaying, for each of the sorted content items, the computed display set of metadata in a deterministic manner selected based on the sorted metadata fields, the deterministic manner defining a predetermined metadata layout for each of the selected sorting metadata fields, each of the content items and corresponding metadata fields concurrently displayed as a GUI element on the display screen.

19. A visual display processor for dynamically arranging metadata on a graphical user interface (GUI) screen based on a selected sort criteria comprising:

means fore receiving a selection of a metadata field operable for sorting a plurality of content items, each of the content items having metadata fields populated depending on attributes of the respective content item;

means for computing, based on the selected metadata field, a set of metadata fields for display as a display set corresponding to the respective content item in the GUI screen, computing further comprising:

means for identifying priority tiers, the priority tiers predetermined prior to instantiation of the current display screen and indicative of groupings of metadata fields for display;

means for defining a priority matrix for mapping, for each metadata field of the content item, one of the priority tiers such that the priority matrix defines predetermined inclusion of a metadata field in a priority tier based on the selected sorting field;

means for identifying a set of display rules, the display rules defining a display priority for each of the priority tiers, the identified display priority based on a metadata field selected as a sorting field and on fields deemed to have particular descriptive value to a user when a particular metadata field is employed as the sorting field; and means for computing based on the set of display rules, at least one priority tier as the display set of metadata fields defined by the display rules responsive to the selected metadata field employed as a sorting field, the display set for display responsively to the particular selected metadata field employed for sorting;

means for defining a priority indicative of a field layout for the metadata fields for display, the field layout defining arrangement of complementary fields together on the GUI screen the priorities metadata fields further comprising:

persistent fields including metadata fields that are mandatory for display;

a secondary priority including the sorting metadata fields;

a tertiary priority including complementary metadata fields of the sorting metadata field; and omitted metadata fields not included in the field layout;

means for sorting the content item set according to the selected metadata field; and means for displaying, for each of the sorted content items, the computed display set of metadata fields for the respective content item according to the defined priority, displaying further comprising displaying the computed display set of data and corresponding metadata fields according to a predetermined metadata layout, each of the content items and corresponding metadata fields concurrently displayed as a GUI element on the display screen;

mapping further comprising mapping, for the selected sorting field, a group of metadata fields in each of the priority tiers, the priority tiers being prioritized according to the informative value of a metadata field based on the selected sorting field, the mapped priority tiers including:

a first priority tier of mandatory field, the mandatory fields being first selected for display;

a second priority tier including the selected sorting field, the sorting field being selected second for display;

a third priority tier including complementary fields, the complementary fields having informational value and being selected third for display; and a fourth priority tier, the fourth priority tier not selected for inclusion in the display set, the priority matrix including the metadata fields in each tier for the selected sorting field.

20. The method of claim 1 further comprising displaying, for each priority tier in the display set, each of the metadata fields in the priority tier along with the corresponding content item.

21. The method of claim 1 wherein identifying the priority tiers further comprises:

identifying a first priority tier of mandatory fields, the mandatory fields being first selected for display;

identifying a second priority tier including the selected sorting field, the sorting filed being selected second for display;

identifying a third priority tier including complementary fields, the complementary fields having informational value and being selected third for display; and identifying a fourth priority tier, the fourth priority tier not selected for inclusion in the display set.

22. The method of claim 21 further comprising selectively including the display tiers in the display set in order of the identified priority.

23. The method of claim 1 wherein the rule set defines a predetermined priority of metadata fields for displaying in response to a selection of each metadata field when selected as the sorting field for the content items, the predetermined priority corresponding to the priority tiers defined in the priority matrix prior to runtime.

* * * * *

UNITED STATES PATENT AND TRADEMARK OFFICE
CERTIFICATE OF CORRECTION

PATENT NO. : 7,620,633 B1　　　　　　　　　　　　　　　　　　　　　　Page 1 of 1
APPLICATION NO. : 11/273646
DATED : November 17, 2009
INVENTOR(S) : Parsons et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 245 days.

Signed and Sealed this

Twenty-sixth Day of October, 2010

David J. Kappos
*Director of the United States Patent and Trademark Office*